United States Patent
Hwang et al.

(10) Patent No.: US 10,958,384 B2
(45) Date of Patent: Mar. 23, 2021

(54) METHOD FOR TRANSMITTING HARQ-ACK SIGNAL IN WIRELESS COMMUNICATION SYSTEM, AND APPARATUS THEREFOR

(71) Applicant: LG Electronics Inc., Seoul (KR)

(72) Inventors: Daesung Hwang, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/477,301

(22) PCT Filed: Jan. 10, 2018

(86) PCT No.: PCT/KR2018/000460
§ 371 (c)(1),
(2) Date: Jul. 11, 2019

(87) PCT Pub. No.: WO2018/131880
PCT Pub. Date: Jul. 19, 2018

(65) Prior Publication Data
US 2019/0379489 A1 Dec. 12, 2019

Related U.S. Application Data

(60) Provisional application No. 62/446,510, filed on Jan. 15, 2017, provisional application No. 62/454,006, (Continued)

(51) Int. Cl.
*H04L 1/18* (2006.01)
*H04L 1/00* (2006.01)
(Continued)

(52) U.S. Cl.
CPC .......... *H04L 1/1819* (2013.01); *H04L 1/0063* (2013.01); *H04L 1/1664* (2013.01); *H04L 5/0051* (2013.01); *H04W 72/042* (2013.01)

(58) Field of Classification Search
CPC ... H04L 1/1819; H04L 1/0063; H04L 1/1664; H04L 5/0051; H04L 1/00; H04L 1/08;
(Continued)

(56) References Cited

U.S. PATENT DOCUMENTS

2012/0002657 A1* 1/2012 Seyama ................ H04L 1/1628
370/338
2016/0205679 A1* 7/2016 Yoo ...................... H04L 1/1854
370/329
(Continued)

FOREIGN PATENT DOCUMENTS

| CN | 104283651 B | 8/2017 |
| EP | 2913951 A1 | 9/2015 |

(Continued)

OTHER PUBLICATIONS

LG Electronics, "Discussion on multiplexing of eMBB and URLLC", 3GPP TSG RAN WG1 NR Ad-hoc Meeting, Jan. 16-20, 2017, R1-1700512.

Primary Examiner — Ivan O Latorre
(74) Attorney, Agent, or Firm — Dentons US LLP

(57) ABSTRACT

The present invention discloses a method for a terminal receiving re-transmitted data in a wireless communication system. In particular, the method may comprise the steps of: receiving from a base station a plurality of transport blocks that include a plurality of code block groups; the respective code block groups mapping and transmitting first HARQ-ACK signals with respect to the respective plurality of code block groups on the basis of an order in which the respective plurality of transport blocks are received, and an order that is included in the respective plurality of transmission blocks; and receiving one or more code block groups that are re-transmitted based on the transmitted first HARQ-ACK signals.

13 Claims, 10 Drawing Sheets

Related U.S. Application Data filed on Feb. 2, 2017, provisional application No. 62/457,832, filed on Feb. 11, 2017, provisional application No. 62/472,009, filed on Mar. 16, 2017, provisional application No. 62/486,987, filed on Apr. 19, 2017.

(51) Int. Cl.
*H04L 1/16* (2006.01)
*H04L 5/00* (2006.01)
*H04W 72/04* (2009.01)

(58) Field of Classification Search
CPC ... H04L 1/16; H04L 1/18; H04L 5/00; H04W 72/042

See application file for complete search history.

(56) References Cited

U.S. PATENT DOCUMENTS

| | | | |
|---|---|---|---|
| 2016/0226643 A1* | 8/2016 | Mallik | H04L 1/1819 |
| 2016/0233999 A1 | 8/2016 | Chendamarai Kannan et al. | |
| 2019/0342036 A1* | 11/2019 | Lei | H04L 1/1635 |

FOREIGN PATENT DOCUMENTS

| | | | | |
|---|---|---|---|---|
| EP | 3200376 A1 | 8/2017 | | |
| JP | 04111553 A | 4/1992 | | |
| JP | 2013542645 A | 11/2013 | | |
| JP | 2013544469 A | 12/2013 | | |
| JP | 2015534360 A | 11/2015 | | |
| JP | 2017011588 A | 1/2017 | | |
| KR | 101533906 B1 | 7/2015 | | |
| WO | 2010109521 A1 | 9/2010 | | |
| WO | WO-2012142914 A1 * | 10/2012 | ........... | H04L 1/0061 |
| WO | 2015184919 A1 | 12/2015 | | |
| WO | 2016182378 A1 | 11/2016 | | |
| WO | 2018128474 A1 | 7/2018 | | |

* cited by examiner (A) CONTROL-PLANE PROTOCOL STACK (B) USER-PLANE PROTOCOL STACK

METHOD FOR TRANSMITTING HARQ-ACK SIGNAL IN WIRELESS COMMUNICATION SYSTEM, AND APPARATUS THEREFOR

This application is a National Stage Entry of International Application No. PCT/KR2018/000460 filed Jan. 10, 2018, which claims priority to U.S. Provisional Application Nos. 62/446,510 filed Jan. 15, 2017; 62/454,006 filed Feb. 2, 2017; 62/457,832 filed Feb. 11, 2017; 62/472,009 filed Mar. 16, 2017 and 62/486,987 filed Apr. 19, 2017, all of which are incorporated herein by reference.

TECHNICAL FIELD

The present invention relates to a method of transmitting a hybrid automatic request (HARQ)-acknowledgement (ACK) signal in a wireless communication system and an apparatus therefor and, more particularly, to a method of transmitting a HARQ-ACK signal in a code block unit or a code block group unit by a user equipment (UE) receiving data in a transport block unit and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

As more communication devices require greater communication capacity in accordance with the trend, a next generation 5G system which is mobile broadband communication more enhanced than the conventional LTE system has been required. In the next generation 5G system referred to as NewRAT, a communication scenario is categorized into Enhanced Mobile BroadBand (eMBB)/Ultra-reliability and Low-Latency Communication (URLLC)/Massive Machine-Type Communications (mMTC).

In this case, eMBB is a next generation communication scenario having properties such as High Spectrum Efficiency, High User Experienced Data Rate, and High Peak Data Rate, and URLLC is a next generation communication scenario (e.g., V2X, Emergency Service, Remote Control) having properties such as Ultra Reliable, Ultra Low Latency, and Ultra High Availability, and mMTC is a communication scenario (e.g., IoT) having properties such as Low Cost, Low Energy, Short Packet, and Massive Connectivity.

DETAILED DESCRIPTION OF THE INVENTION

Technical Problems

The present invention provides a method of transmitting a HARQ-ACK signal in a wireless communication system and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

According to an aspect of the present invention, provided herein is a method of receiving retransmitted data by a user equipment (UE) in a wireless communication system, including receiving a plurality of transport blocks including a plurality of code block groups from a base station (BS); mapping a plurality of code block groups to first hybrid automatic request (HARQ)-acknowledgement (ACK) signals, based on an order of reception of each of the plural transport blocks and an order of the code block groups included in each of the plural transport blocks, and transmitting the first HARQ-ACK signals; and receiving one or more code block groups retransmitted based on the transmitted first HARQ-ACK signals.

Even-numbered or odd-numbered code block groups in each of the plural transport blocks may be mapped to the first HARQ-ACK signals first and then the remaining code block groups may be additionally mapped to the first HARQ-ACK signals.

Code block groups starting from a code block group having a lowest index in each of the transport blocks, among the code block groups included in each of the plural transport blocks, may be mapped to the first HARQ-ACK signals in ascending order.

Only at least one code block group corresponding to a negative-acknowledgement (NACK) signal among the plural code block groups may be mapped to the first HARQ-ACK signal.

A second HARQ-ACK signal for each of the plural transport blocks may be transmitted together with the first HARQ-ACK signal, and the first HARQ-ACK signal and the second HARQ-ACK signal may be transmitted over different channels.

If the number of the code blocks included in the plural TBs is smaller than a threshold, only the second HARQ-ACK signal may be transmitted.

The first HARQ-ACK signals may be transmitted in a form of being piggybacked on an uplink data channel.

The first HARQ-ACK signal may include a cyclic redundancy check (CRC) bit for checking whether the first HARQ-ACK signal is received, and downlink control information (DCI) including information as to whether the first HARQ-ACK signal is received, based on the CRC bit, may be received from the BS.

In another aspect of the present invention, provided herein is a user equipment (UE) for receiving retransmitted data in a wireless communication system, including a radio frequency (RF) module configured to transmit and receive a radio signal to and from a base station (BS); and a processor connected to the RF module and configured to receive a plurality of transport blocks including a plurality of code block groups from the BS, map a plurality of code block groups to first hybrid automatic request (HARQ)-acknowledgement (ACK) signals, based on an order of reception of each of the plural transport blocks and an order of the code block groups included in each of the plural transport blocks, and transmit the first HARQ-ACK signals, and receive one or more code block groups retransmitted based on the transmitted first HARQ-ACK signals.

Even-numbered or odd-numbered code block groups in each of the plural transport blocks may be mapped to the first HARQ-ACK signals first and then the remaining code block groups may be additionally mapped to the first HARQ-ACK signals.

Only at least one code block group corresponding to a negative-acknowledgement (NACK) signal among the plural code block groups may be mapped to the first HARQ-ACK signal.

A second HARQ-ACK signal for each of the plural transport blocks may be transmitted together with the first HARQ-ACK signal, and the first HARQ-ACK signal and the second HARQ-ACK signal may be transmitted over different channels.

If the number of the code blocks included in the plural TBs is smaller than a threshold, only the second HARQ-ACK signal may be transmitted.

The first HARQ-ACK signals may be transmitted in a form of being piggybacked on an uplink data channel.

The first HARQ-ACK signal may include a cyclic redundancy check (CRC) bit for checking whether the first HARQ-ACK signal is received, and downlink control information (DCI) including information as to whether the first HARQ-ACK signal is received, based on the CRC bit, may be received from the BS.

Advantageous Effects

According to the present invention, data retransmission may be efficiently performed based on HARQ-ACK signal transmission of a code block group unit.

BEST MODE FOR CARRYING OUT THE INVENTION

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
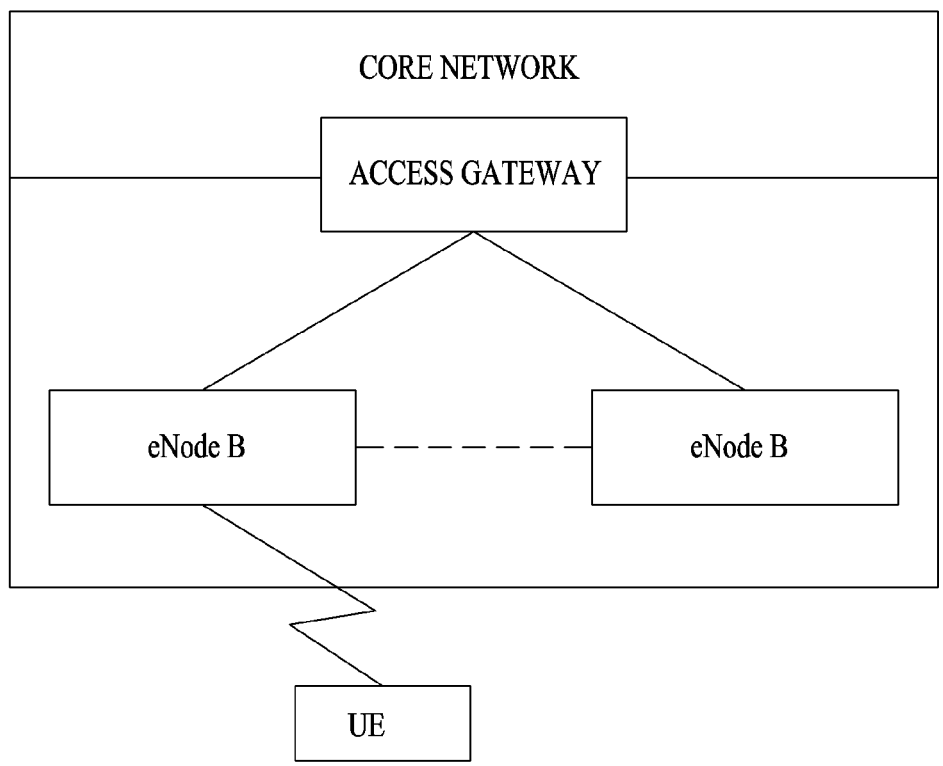
FIG. 1 is a schematic diagram of E-UMTS network structure as one example of a wireless communication system.
Figure 2:
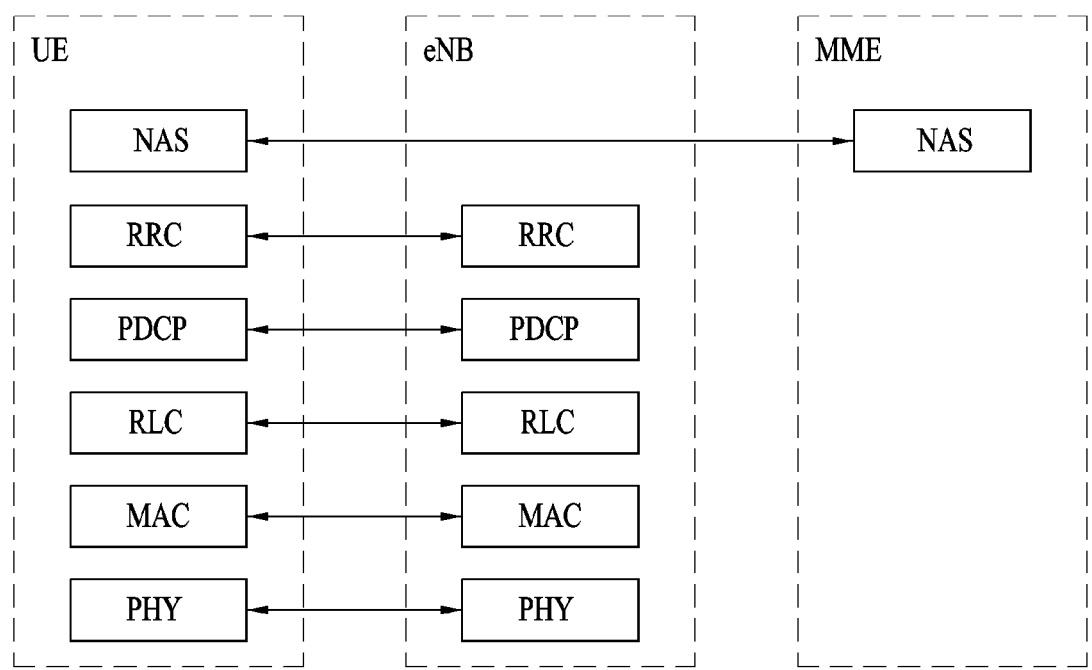
FIG. 2 is a diagram for structures of control and user planes of radio interface protocol between a 3GPP radio access network standard-based user equipment and E-UTRAN.
Figure 2:
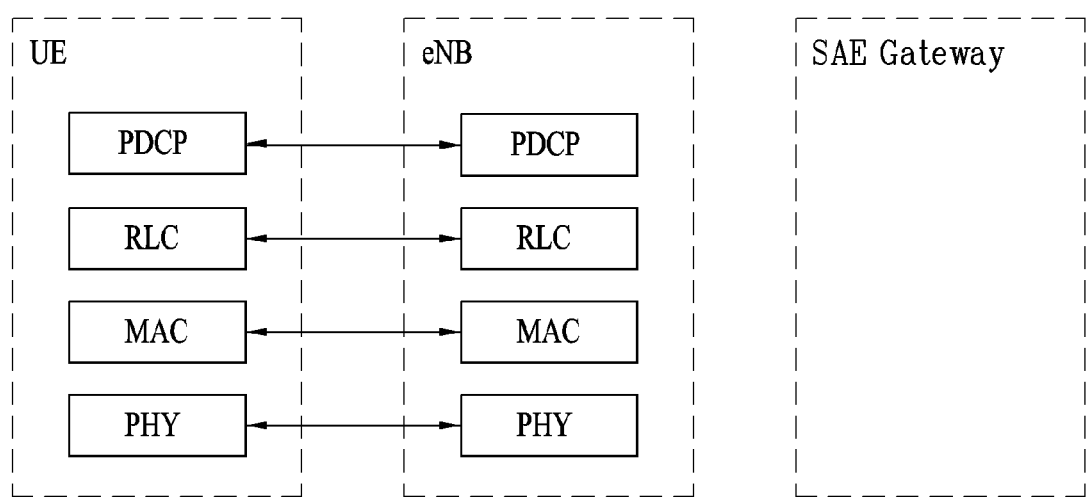

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
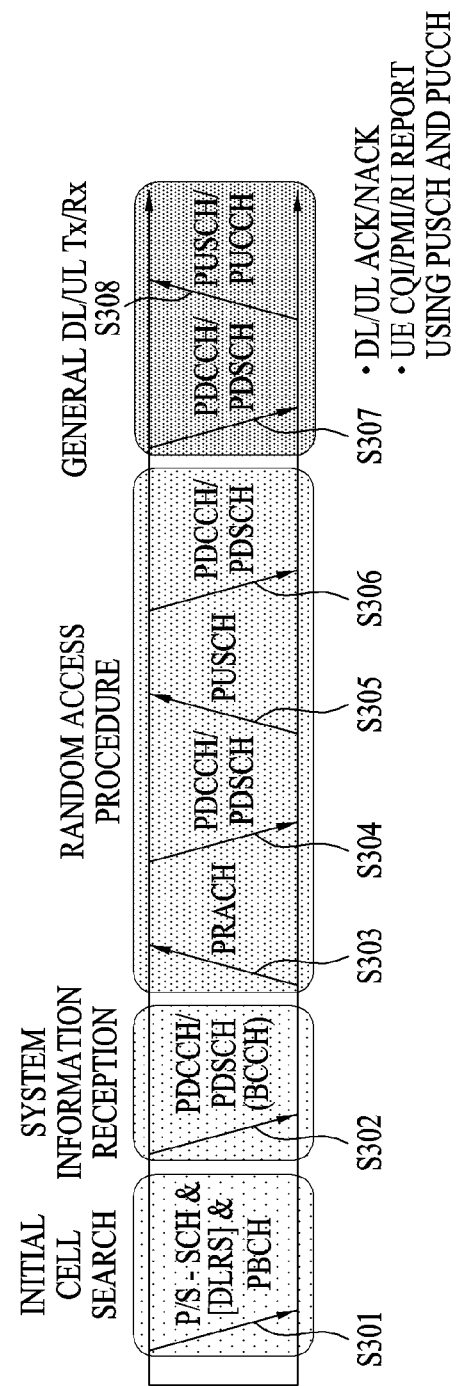
FIG. 3 is a diagram for explaining physical channels used for 3GPP system and a general signal transmission method using the physical channels.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
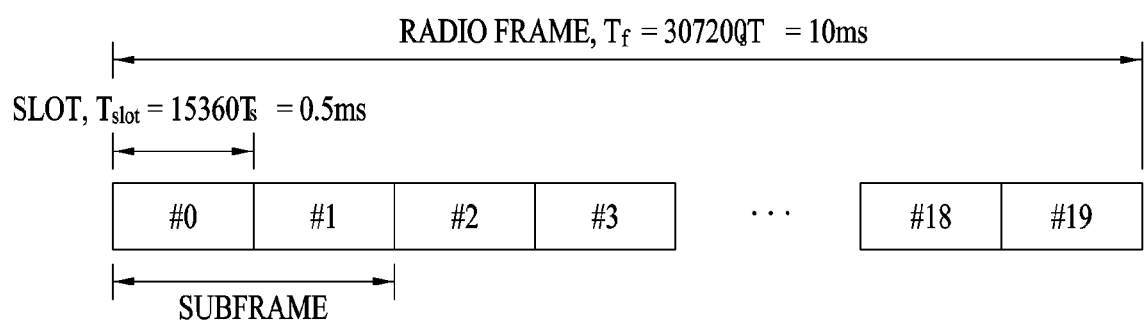
FIG. 4 is a diagram for a structure of a radio frame in LTE system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of 01-DM symbols in a slot may vary.

Figure 5:
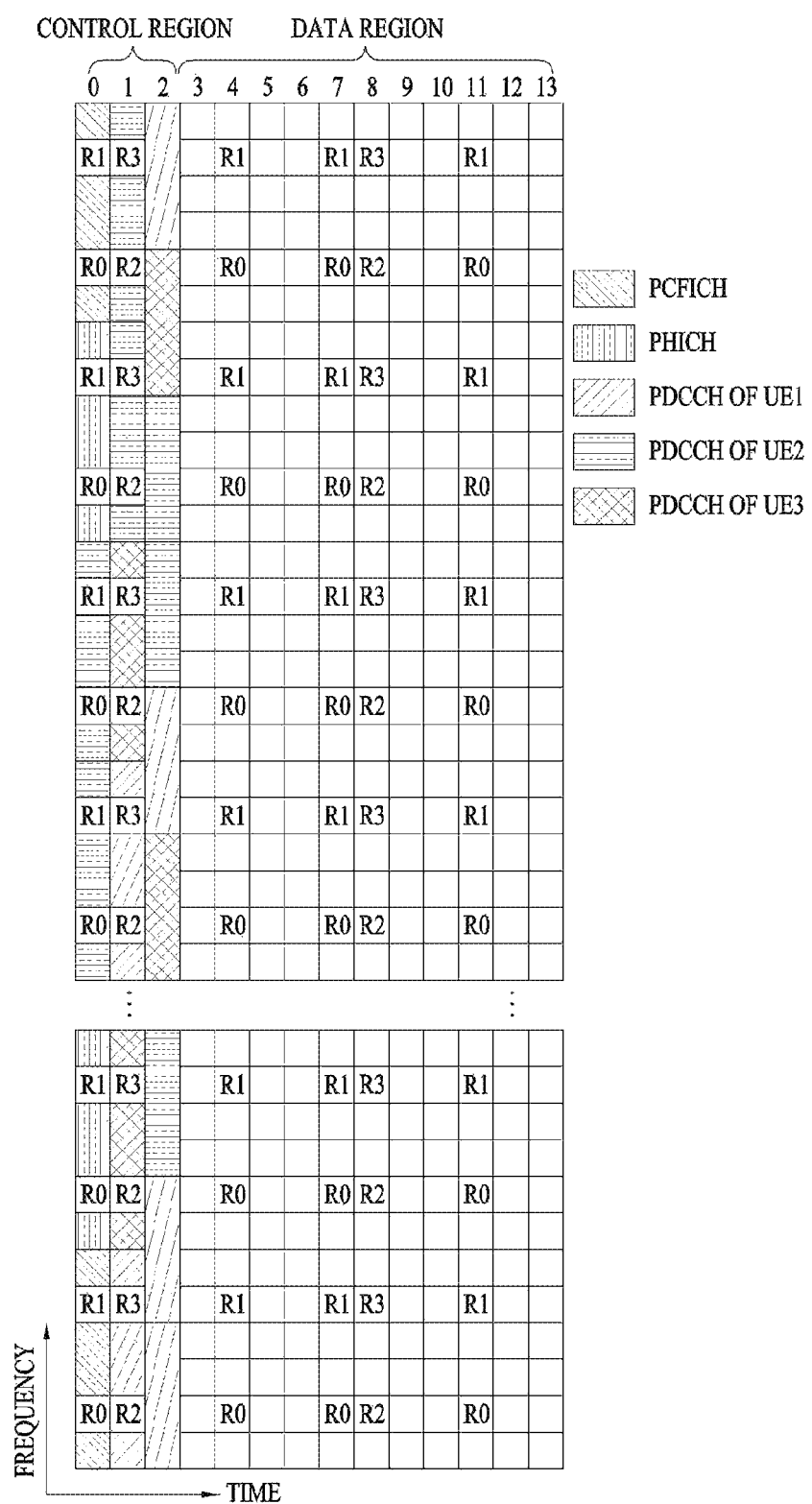
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
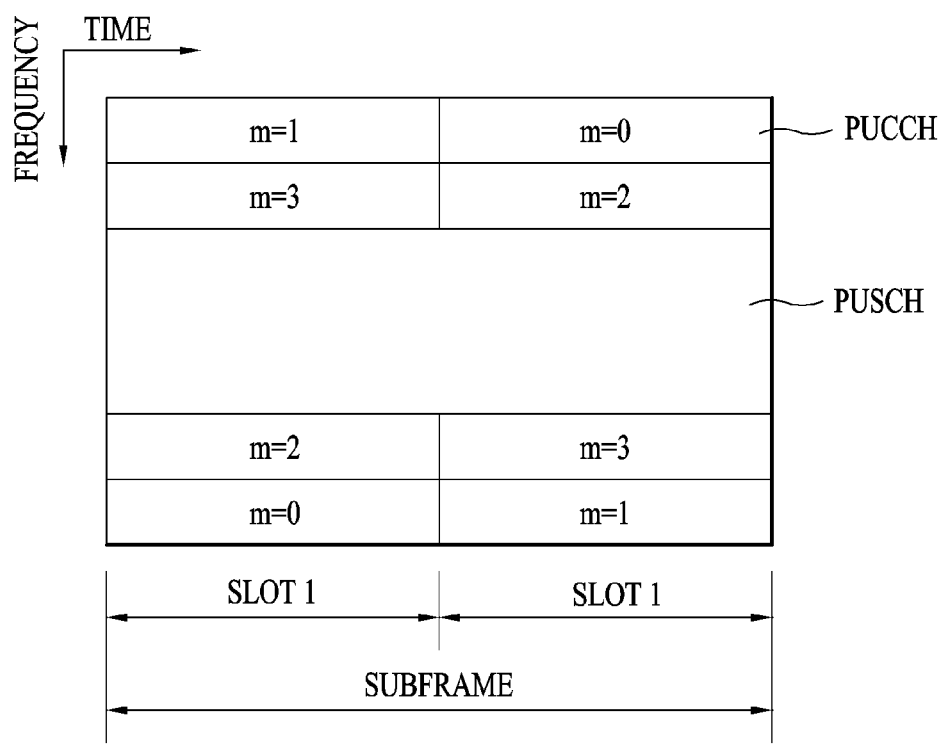
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64 (8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
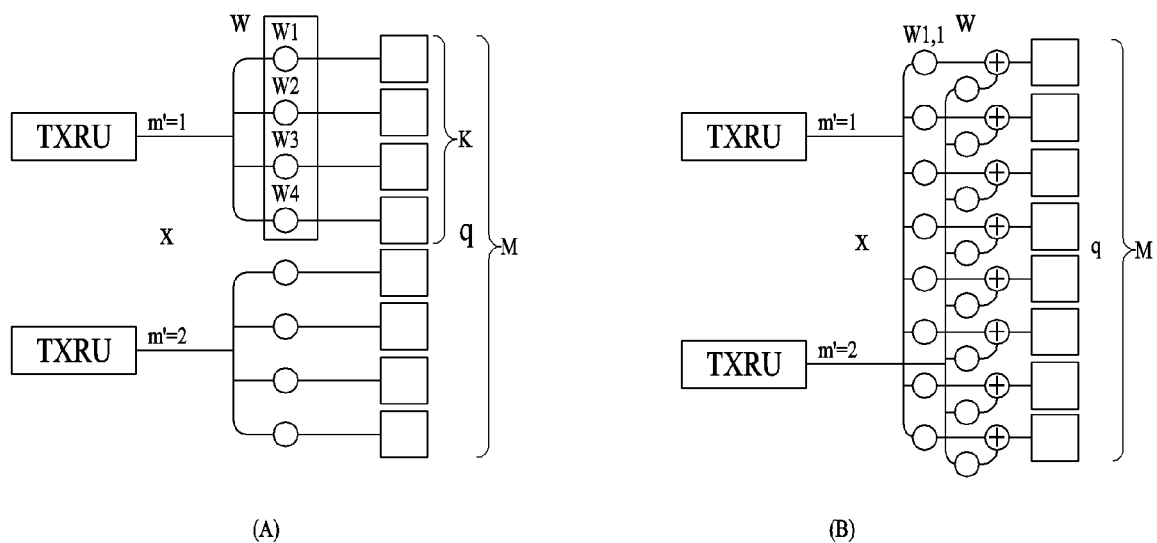
FIG. 7 illustrates examples of a connection scheme between TXRUs and antenna elements.

FIG. 7 illustrates examples of a connection scheme between TXRUs and antenna elements.

Figure 8:
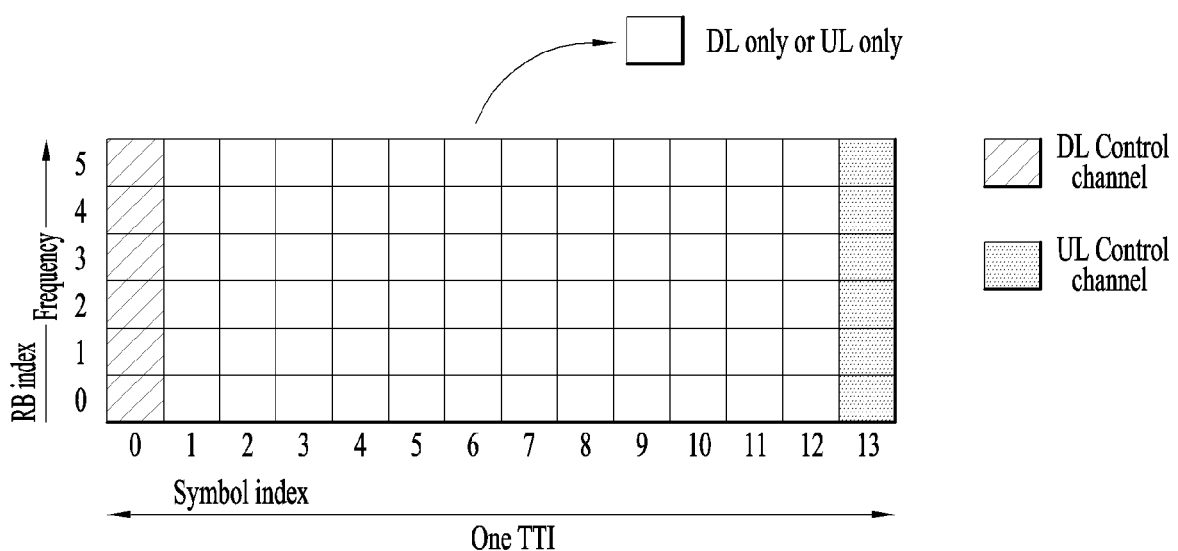
FIG. 8 illustrates an example of a self-contained subframe structure.

(a) of FIG. 7 illustrates that TXRU is connected to a sub-array. In this case, the antenna elements are connected to only one TXRU. Unlike (a) of FIG. 7, (b) of FIG. 7 illustrates that TXRU is connected to all antenna elements. In this case, the antenna elements are connected to all TXRUs. In FIG. 8, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period In 5G NewRAT, a signal transmissions scheme may differ according to services or requirements. For example, a transmission time unit of an enhanced mobile broadband (eMBB) may be relatively long and a transmission time unit of an ultra-reliable and low latency communications (URLLC) may be relatively short.

According to a service type, particularly, in the case of an urgent service, a URLLC signal may be transmitted on a corresponding resource even while eMBB is being transmitted. Accordingly, in terms of a network or a UE, URLLC transmission may consider preemption of a partial transmission resource of eMBB.

In this case, a part of a transmission resource of eMBB having a relatively long transmission time unit may be punctured due to the preemption and an eMBB signal may be modified because the eMBB signal is superimposed on another signal such as the URLLC signal.

When URLLC transmission preempts a partial resource of eMBB transmission, there is a high possibility that the UE fails to decode a specific code block (CB) of eMBB transmission. Particularly, this situation may cause decoding failure for a specific CB even when a channel state is good. Therefore, 5G NewRAT may consider performing retransmission in a CB unit, rather than retransmission in a transport block (TB) unit.

Accordingly, the present invention proposes a HARQ-ACK transmission method to perform retransmission of a CB unit.

<HARQ-ACK Transmission Timing of CB Group Unit>

For retransmission of a code block group (CBG) unit, HARQ-ACK transmission also needs to be performed in the CBG unit. In this case, HARQ-ACK transmission of the CBG unit may be performed in a mini-slot unit, a URLLC transmission time unit, or a symbol group unit. One or more HARQ-ACK signals of the CBG unit for the same TB or for the same PDSCH may be transmitted on a UL resource of the same timing. Use of the UL resource of the same timing may reduce overhead when DCI for scheduling a PDSCH indicates a HARQ-ACK timing.

A HARQ-ACK timing may be indicated in the CBG unit. For example, CBGs corresponding to URLLC preemption during eMBB transmission may be retransmitted before HARQ-ACK signals for the CBGs are transmitted and retransmission for the other CBGs may be performed after HARQ-ACK signals are transmitted.

HARQ-ACK configuration of a CBG corresponding to URLLC preemption may be performed after retransmission is performed. That is, it may be useful that a HARQ-ACK transmission timing for a CBG is differently configured according to whether URLLC preemption is performed. For example, in order to avoid ambiguity generated by missing a specific indication signal, a HARQ-ACK signal of a CBG corresponding to URLLC preemption may be transmitted multiple times. In addition, during HARQ-ACK transmission for a CBG having no relation to URLLC preemption, a HARQ-ACK signal of a CBG corresponding to URLLC preemption may also be transmitted.

As another example, a HARQ-ACK transmission timing for each CBG may be different regardless of URLLC preemption. For example, a plurality of HARQ-ACK signals for the same PDSCH may be transmitted based on a time-domain resource to which a CBG is mapped.

In addition, all CBGs may be automatically allocated to respective HARQ-ACK feedback signals according to a setting value. In this case, one CBG may be allocated to a plurality of HARQ-ACK feedback signals. For example, the first N CBGs may correspond to first HARQ-ACK feedback signals and the next N CBGs may correspond to second HARQ-ACK feedback signals.

A HARQ-ACK transmission timing of specific CBGs may be updated using the indication signal regardless of URLLC preemption. For example, HARQ-ACK feedback for CBGs which are not indicated by the indication signal may be configured by a transmission timing indicated through DCI or a higher layer and HARQ-ACK feedback for CBGs indicated by the indication signal may be separately configured.

<HARQ-ACK Configuration Method of CBG Unit>

The number of CBs for the same PDSCH may differ according to whether MIMO transmission is performed or according to the number of TBs or a TB size. The TB size may be determined according to each TB. Therefore, the number of CBs constituting a TB may differ according to each TB.

If CBG-based retransmission is configured, an embodiment of configuring a HARQ-ACK signal of a CBG unit is as follows.

1. Embodiment 1-1

A HARQ-ACK payload may be configured based on a preset maximum number of CBGs or may be determined based on information transmitted by DCI or a higher layer. For example, the number of CBGs is configured according to a HARQ-ACK codebook size configured by the DCI or the higher layer and the HARQ-ACK payload may be configured based on the configured number of CBGs. In this case, the number of CBs constituting a CBG may differ according to a TB size. Specifically, when the number of CBGs or the size of the HARQ-ACK payload corresponding to the number of CBGs is configured by the higher layer, the number of CBGs or the size of the HARQ-ACK payload may be configured based on system bandwidth or may be designated as a value of a specific bandwidth part (BWP) or a value for each of a plurality of BWPs having different sizes, in consideration of a wideband operation.

Alternatively, the number of CBGs or the size of the HARQ-ACK payload may be configured by designating a time and/or frequency resource unit which is referenced to configure a CBG. For example, if one symbol is configured as a reference unit for configuring the CBG by the higher layer regardless of bandwidth, then CBs, all or a part of which are superimposed on each symbol, may constitute the CBG. Alternatively, when the reference unit for configuring the CBG is configured by two symbols of 100 RBs, if a UE operates on 4 symbols in 200 RBs, the number of CBGs may be 4.

An embodiment of a method of configuring a CB to be included in a CBG according to a configured number of CBGs is as follows.

(Case 1) Case in which the Number of CBs is Smaller than the Set Number of CBGs

When the number of CBs is smaller than or equal to a preset number N (e.g. N=1), HARQ-ACK of a CB unit may fall back to HARQ-ACK of a TB unit. This is because, if the number of CBs is smaller than a predetermined number, efficiency for transmitting HARQ-ACK of a CBG unit will be reduced. For example, if the number of CBs included in a TB is 1, a HARQ-ACK signal of a TB unit and a HARQ-ACK signal of a CBG unit are substantially the same. In this case, only signaling overhead increases and efficiency of retransmission to be obtained by transmitting the HARQ-ACK signal of the CBG unit is small.

Accordingly, if the number of CBs is smaller than N, overall communication efficiency may be raised through fallback to HARQ-ACK transmission of the TB unit.

If the number of CBs is larger than the preset number N but is smaller than the number of CBGs, plural CBs are mapped to a HARQ-ACK signal of each CBG one by one. The remaining CBs are grouped two by two and two CBs are mapped to a HARQ-ACK signal of each CBG. If CBs still remain, CBs may be grouped 4 by 4 and 4 CBs may be mapped to a HARQ-ACK signal of each CBG. In this case, HARQ-ACK signals may be filled starting from a CBG of a low index and the remaining HARQ-ACK signals may be represented as NACK.

In other words, plural CBs are mapped to HARQ-ACK signals of CBGs, respectively and CBs which are to be included in the remaining CBGs are mapped again. For example, when the number of CBGs is 4 and the number of CBs is 3, the first two CBs may be mapped to the first two HARQ-ACK bits and the third CB and the first CB may be mapped to the next two HARQ-ACK bits. In this case, the HARQ-ACK signal for the first CB is mapped to HARQ-ACK bits of the remaining CBGs so that loss of HARQ-ACK signals may be reduced through repeated transmission.

(Case 2) Case in which the Number of CBs is Larger than the Preset Number of CBGs but the Number of CBs is not a Multiple of the Preset Number of CBGs (i.e., Case in which the Number of CBs is not Divided by the Number of CBGs without a Remainder)

1) Ceil (number of CBs/number of CBGs) is calculated using the number of CBs which are to be included in each CBG. Next, CBs are mapped to HARQ-ACK signals of CBGs in a non-overlapping form. The remaining CBs may be mapped to a HARQ-ACK signal of the last CBG. If there are no remaining CBs, a HARQ-ACK signal for the first CB of a CBG in which NACK is generated for the first time may be repeatedly mapped to the last CBG.

2) Information about one CB may belong to multiple CBGs. For example, if a CBG may be configured per symbol, a CB in multiple symbols may be included in multiple CBGs and may be mapped to HARQ-ACK signals of the multiple CBGs. As another example, the CB may be mapped to HARQ-ACK signals for one or more CBGs according to a divided number.

3) When a CBG is configured per symbol, if a data duration is smaller than the number of CB durations, a HARQ-ACK signal for each CBG is transmitted and then a HARQ-ACK signal for the first CB of CBGs in which NACK occurs or a HARQ-ACK for a specific CB is mapped in correspondence to the remaining bits. If bits still remain, a HARQ-ACK signal for the second CB of the DBGs in which NACK occurs is mapped. The above-described scheme of 2) and/or 3) may be applied in a state in which restriction of a CBG configuration per symbol is removed under the assumption that the total number of CBGs is the set number of DBGs. That is, even when a CBG is not configured per symbol, the scheme of 2) and/or 3) may be used under the assumption that the set number of CBGs is the total number of CBs and, thus, each CB may be mapped to each HARQ-ACK signal based on the total number of CBs.

2. Embodiment 1-2

A HARQ-ACK payload size is configured according to the number of CBGs configured based on information or scheduling indicated by DCI. The information indicated by the DCI may include a starting point or a duration of a PDSCH/PUSCH and a TB size (TBS).

In this case, 1) the number of CBGs may be defined according to the TBS, 2) the number of CBGs may be defined according to a data duration, or the HARA-ACK payload size may be configured based on the number of CBGs which is small or large among the results of 1) and 2). Specifically, as an example of 1), the number of CBs per CBG may be configured and, thus, the number of CBGs may be defined according to the number of CBs. As an example of 2), the number of CBGs may be defined as a value obtained by dividing the number of OFDM symbols for data transmission by a specific number.

Although the number of HARQ-ACK bits may always be equal to the number of CBGs, a predetermined number of bits may be added to the HARQ-ACK bits so that additional information may be transmitted. As an example of transmission of the additional information, as many HARQ-ACK signals for the first CBs of CBGs in which NACK occurs as the number of added bits may be sequentially transmitted, a HARQ-ACK signal for each CB of the first CBG in which NACK occurs may be transmitted, or HARQ-ACK bits may be repeatedly transmitted through another CBG configuration which may be a CBG configuration of a larger size than a previous CBG. Alternatively, the additional information may be used to indicate a desired modulation and coding scheme (MCS) level or may be used for feedback other than a HARQ-ACK signal. The additional bits may be designated per codeword/TB or may be a value determined with respect to one PUCCH.

If HARQ-ACK signals are bundled with respect to a plurality of slots or a plurality of carriers per CB or CBG and then transmitted or HARQ-ACK transmission for the plural slots is performed in one UL slot, it is assumed that the number of CBGs or the number of HARQ-ACK bits, transmitted in one slot, is configured to be equal by the DCI in order to avoid ambiguity of the number of bits corresponding to each slot. That is, even when the UE receives only one DCI corresponding to one UL slot, the same information may be applied to different slots.

If a timing for transmitting a HARQ-ACK signal is designated through the DCI and the UE fails to receive the DCI, it may be assumed that a HARQ-ACK signal for a DL slot is transmitted as NACK using a total downlink assignment index (DAI). For such transmission, a DAI may be separately maintained per scheduling for a PDSCH over which a HARQ-ACK signal is transmitted through one UL slot.

If the total DAI is used, the number of HARQ-ACK bits may be determined together with the number of CBGs. In this case, a different number of CBGs per slot may be designated. That is, the number of CBGs transmitting a HARQ-ACK signal per scheduling is indicated and the total number of CBGs or the number of HARQ-ACK bits, mapped to the same UL slot, may be indicated together. As described above, if the total DAI includes the number of CBGs, ambiguity regarding how many slots are scheduled may occur.

For example, after the total DAI of 8 is received, when a total DAI of 16 is received and 4 CBGs are scheduled in a corresponding slot, 4 CBGs which are not received in the corresponding slot may have been transmitted through one or more other slots. Therefore, if information about each slot is needed, an additional slot number or the number of scheduled TBs needs to be indicated together.

The number of CBGs or the number of HARQ-ACK bits for each PDSCH may be fixed to a specific value and the DAI may indicate only an order of a PDCCH and/or a PDSCH and the number of PDCCHs and/or PDSCHs. Alternatively, the DAI may indicate only the number of scheduled codewords or the number of scheduled TBs. In this case, it may be assumed that the same number of CBGs is applied to a plurality of codewords or TBs mapped to the same PUCCH resource.

A DCI size or content for retransmission may differ according to Embodiment 1-1 and Embodiment 1-2. Whether to configure a HARQ-ACK signal according to Embodiment 1-1 or a HARQ-ACK signal according to Embodiment 1-2 may be determined through a MAC CE, RRC signaling, or L1 signaling.

For example, if the UE fails to detect the DCI, since ambiguity of a HARQ-ACK configuration may occur, Embodiment 1-1 may be proper. If Embodiment 1-1 is applied, a set of HARQ-ACK signals for a plurality of PDSCHs may be transmitted through the same PUCCH.

If the UE fails to detect DCI, the UE may not transmit the PUCCH. Accordingly, assuming that PUCCH transmission occurs after the DCI is detected, application of Embodiment 1-2 may be proper.

Information as to which one of a TB-based HARQ-ACK scheme and a CBG-based HARQ-ACK scheme will be used for each PDSCH transmission or information about a HARQ-ACK codebook size and the size or number of bits may be indicated by the DCI or a higher layer. Alternatively, the UE may select the information according to the number of configured CBs or an interference environment thereof.

When the UE selects the information, different resources may be configured for a TB-based HARQ-ACK signal and a CB-based HARQ-ACK signal. If HARQ-ACK transmission for a plurality of DCIs or PDSCHs is performed on the same PUCCH resource, information about a total HARQ-ACK codebook size may be included in the DCI.

CB-based HARQ-ACK feedback may be configured by distinguishing between dynamic configuration of a HARQ-ACK transmission timing and semi-static configuration of the HARQ-ACK transmission timing. For example, the number of CBGs may vary only when the HARQ-ACK transmission timing and an interval between DL assignment and HARQ-ACK feedback are semi-statically configured.

Even if the transmission timing is dynamically configured, the number of CBGs may vary only when HARQ-ACK feedback signals for a plurality of PDSCHs are subjected to time division multiplexing (TDM) or each of HARQ-ACK feedback signals for a plurality of PDSCHs is transmitted over a separate channel. Even when the transmission timing is dynamically configured, if the UE may assume that the number of CBGs for a plurality of PDSCHs is the same, the number of CBGs may be variable.

In this case, a HARQ-ACK codebook size may vary with the number of scheduled CBGs and a PUCCH format may also be changed.

A HARQ-ACK mapping method based on the PUCCH format may be as follows.

1. Embodiment 2-1

HARQ-ACK signals for CBGs of the first TB are arranged and HARQ-ACK signals for CBGs of the second TB are arranged. If codeword swapping has been performed, an order of the first TB and the second TB may be interchanged. Alternatively, HARQ-ACK signals for CBGs of each TB may be arranged based on the number of HARQ-ACK bits per TB. For example, a HARQ-ACK signal for a CBG of a TB having a large number of HARQ-ACK bits may be arranged in the front part.

2. Embodiment 2-2

HARQ-ACK signals for CBGs for all TBs may be arranged. In this case, an order of the TBs may be different according to codeword swapping and the TBs may be arranged based on the number of HARQ-ACK bits for each TB. Next, HARQ-ACK signals for even-numbered CBGs (or odd-numbered CBGs) included in each TB may be arranged first and then HARQ-ACK signals for odd-numbered CBGs (or even-numbered CBGs) included in each TB may be arranged.

Figure 9:
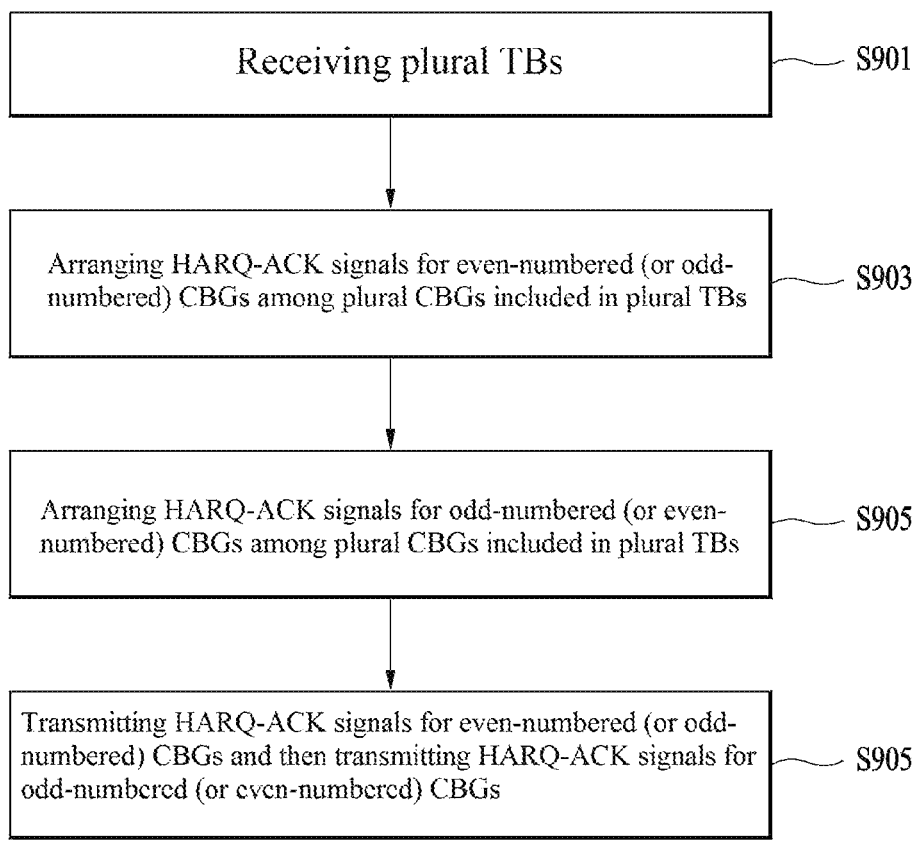
FIGS. 9 and 10 are diagrams illustrating a NARQ-ACK signal mapping method according to an embodiment of the present invention.

This will now be described in detail with reference to FIG. 9. Assuming that a UE receives two TBs (S901), the UE arranges HARQ-ACK signals for even-numbered CBGs (or odd-numbered CBGs) among CBGs of the first TB and arranges HARQ-ACK signals for even-numbered CBGs (or odd-numbered CBGs) among CBGs of the second TB (S903). Then, the UE arranges HARQ-ACK signals for odd-numbered CBGs (or even-numbered CBGs) among the CBGs of the first TB and arranges HARQ-ACK signals for odd-numbered CBGs (or even-numbered CBGs) among the CBGs of the second TB (S905). Next, the UE transmits the arranged HARQ-ACK signals (S907).

Alternatively, HARQ-ACK signals may be arranged starting from a low index in an order of indexes of CBGs included in a TB. That is, HARQ-ACK signals may be arranged such that a HARQ-ACK signal for the first CBG of the first TB is arranged, a HARQ-ACK signal for the first CBG of the second TB is arranged, a HARQ-ACK signal for the second CBG of the first TB is arranged, and a HARQ-ACK signal for the second CBG of the second TB is arranged.

In Embodiment 2-2, error protection for each TB may be distributed over all TBs as equally as possible.

3. Embodiment 2-3

HARQ-ACK signals for all TBs may be transmitted and only HARQ-ACK signals for CBs of a TB in which NACK occurs may be transmitted. In this case, HARQ-ACK signals for TBs may be arranged and HARQ-ACK signals for CBs or CBGs for each TB in which a NACK signal occurs may be sequentially arranged.

Figure 10:
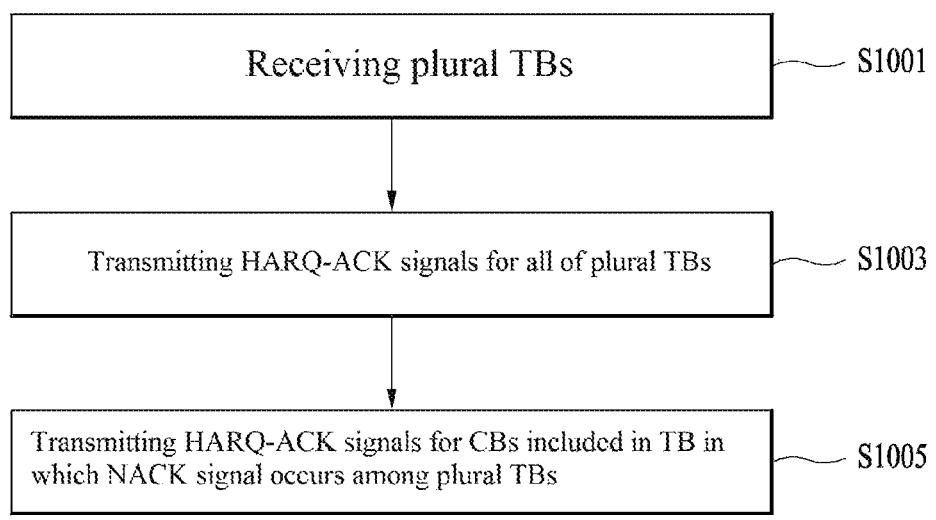

As illustrated in FIG. 10, if the UE receives a plurality of TBs (S1001), the UE may transmit HARQ-ACK signals for all of the TBs (S1003). HARQ-ACK signals for CBs or CBGs included in a TB in which a NACK signal is generated among the plural TBs may be retransmitted (S1005).

Although the number of HARQ-ACK bits for each CB or CBG may differ according to the number of CBs or CBGs configured in a TB in which NACK occurs, the number of HARQ-ACK bits may be fixed.

Since information about a CB may be acquired only when HARQ-ACK signals for the first TB are transmitted, separate encoding of the HARQ-ACK signals for the first TB may be considered. In this case, the separately encoded HARQ-ACK signals and HARQ-ACK signals for TBs after the second TB may be transmitted on the same PUCCH resource when a single-carrier property is required. Moreover, the HARQ-ACK signals may be transmitted on the same PUCCH resource through higher layer configuration. However, the separately encoded HARQ-ACK signals and the HARQ-ACK signals for TBs after the second TB may be transmitted on independently configured PUCCH resources.

If there is no TB in which a NACK signal occurs, only HARQ-ACK signals for TBs may be transmitted.

The number of HARQ-ACK bits for a CB or a CBG may have various values. The size of a HARQ-ACK signal for a corresponding CBG may (1) correspond to the maximum number of CBs or CBGs for a TB, (2) correspond to the number of CBs or CBGs according to a corresponding TBS, or (3) be indicated in the form of UCI during PUCCH transmission.

As in (3), if the size of a HARQ-ACK signal for a CBG is indicated by a PUCCH, this may be indicated through a HARQ-ACK signal for a TB. The number of HARQ-ACK bits for a CBG may be preset.

For example, if the number of TBs is 5 and the total number of HARQ-ACK bits is 20, the number of bits may be 15 for one codeword.

If a NACK signal occurs in two TBs, it is assumed that the number of CBGs is 7 by dividing 15 bits by 2 TBs. In this case, 7 or 8 CBGs may be configured. Similarly, if a NACK signal occurs in 5 TBs, it may be assumed that 3 CBGs are configured per TB.

4. Embodiment 2-4

A HARQ-ACK signal for a TB or a HARQ-ACK signal for a CBG are transmitted over a first channel and information about a CBG in which a NACK signal occurs or information about a CB in which a NACK signal occurs is transmitted over a second channel. To this end, a resource for a first PUCCH and a resource for a second PUCCH may be dynamically configured through DCI. Although it may be assumed that timing values such as latency values for the first PUCCH and the second PUCCH are equal, time and frequency resources may be differently configured. For example, the first and second channels may be transmitted through two short PUCCHs.

HARQ-ACK transmission or retransmission scheduling of a CBG unit may be configured by a higher layer. In this case, the number of CBs may be small according to a TBS. Then, HARQ-ACK transmission or retransmission scheduling may automatically fall back to TB-based HARQ-ACK transmission and retransmission scheduling. For example, even when the number of CBGs is set to N through the DCI or a higher layer, if the number of CBs is smaller than N, an operation may fall back to a TB-based operation.

During fallback, in Embodiment 2-3, a channel for HARQ-ACK transmission of a CBG is not used. The DCI may indicate whether a HARQ-ACK signal or scheduling is a TB unit or a CBG unit. When bundling is performed, it may be assumed that such indication is the same for a bundled target.

<Method of Configuring HARQ-ACK Signal of CBG Unit and HARQ-ACK Signal of TB Unit>

There may be various types of data traffic transmitted and received by a single UE. Even if one type of traffic is transmitted and received, a HARQ-ACK signal of a TB unit and a HARQ-ACK signal of a CBG unit may be transmitted at the same timing. In this case, the HARQ-ACK signal of the TB unit transmitted at a timing at which the HARQ-ACK signal of the CBG unit is transmitted may be transmitted by changing the type of traffic to the CBG unit.

On the other hand, the HARQ-ACK signal of the TB unit and the HARQ-ACK signal of the CBG unit may be separately transmitted. Particularly, when the UE does not need to greatly consider a single carrier property, the HARQ-ACK signal of the CB unit and the HARQ-ACK signal of the TB unit may be transmitted over different channels. For example, the HARQ-ACK signal of the CB unit and the HARQ-ACK signal of the TB unit may be piggybacked on a PUSCH. That is, if a network desires to receive a HARQ-ACK signal for each CBG, the PUSCH may also be scheduled and the HARQ-ACK signal for the CBG may be transmitted over the PUSCH.

In this case, scheduling of the PUSCH should be performed. If the UE fails to receive a UL grant, default PUSCH information may be used or a HARQ-ACK signal of a CB or a CBG unit may be dropped.

In addition, the HARQ-ACK signal of the TB unit and the HARQ-ACK signal of the CB or CBG unit may be transmitted over additional channels or on different resources. For example, the HARQ-ACK signal of the TB unit may be transmitted over a first PUCCH and the HARQ-ACK signal of the CB or CBG unit may be transmitted over a second PUCCH. In this case, both information about the second PUCCH and information of piggyback UCI may be indicated. Alternatively, the HARQ-ACK signal of the TB unit and the HARQ-ACK signal of the CB unit may be transmitted over one channel through separate encoding. The size of the HARQ-ACK signal of the TB unit may be fixed and the size of the HARQ-ACK signal of the DB unit may be variable.

In this case, the size of the HARQ-ACK signal of the CB unit may be implicitly indicated as the number of TBs in which a NACK signal is generated under the assumption that the size of a CBG of each of TBs in which the NACK signal is generated is the same. A bit indicating that the second PUCCH is present may be included in the first PUCCH. In this case, channel design and resource allocation may be performed such that the PUCCH or the PUSCH may be subjected to frequency division multiplexing (FDM) or code division multiplexing (CDM). Information as to whether the HARQ-ACK signal of the TB unit and the HARQ-ACK signal of the CB unit are simultaneously transmitted or can be simultaneously transmitted may be transmitted and received between the UE and the gNB by UE capability signaling or a higher layer signal.

If the UE needs to consider a single carrier property or the single carrier property is configured, simultaneous transmission of the HARQ-ACK signal of the CBG unit and the HARQ-ACK signal of the TB unit over the same channel may be considered.

In this case, the HARQ-ACK signals may be encoded through separate channel coding which will hereinafter be referred to as separate coding.

Particularly, this scheme is useful when protection is differently configured because a plurality of CBs is impacted if the UE fails to receive the HARQ-ACK signal of the TB unit or an error occurs, with respect to the same traffic.

However, since complete information about a TB may be acquired only when information about all CBs should be completed, joint coding may be performed through same channel coding.

Which one of the above-described schemes will be selected may differ according to a waveform used by the UE. For example, for OFDM, separate channels may be assumed and, for DFT-s-OFDM, the same channel may be considered. According to a coverage issue, for DFT-s-OFDM, the HARQ-ACK signal of the CB or CBG unit may be disabled. Alternatively, the HARQ-ACK signal of the TB unit and the HARQ-ACK signal of the CB or CBG unit may be configured to be transmitted in different slots or in different time regions. In this case, power may be kept equal in consideration of a power transient phenomenon or a gap may be permitted between the HARQ-ACK signal of the TB unit and the HARQ-ACK signal of the CB or CBG unit.

<HARQ-ACK Bundling Scheme>

If the number of bits increases, PUCCH performance may be degraded. Therefore, a method of reducing the number of HARQ-ACK bits is needed. Particularly, in the case of spatial bundling, a bundling scheme when the number of CBs of each TB is different is needed. A method of performing bundling proposed in the present invention is as follows.

1. Embodiment 1

If the number of HARQ-ACK bits exceeds a preset number or the number of HARQ-ACK bits (a codebook size) configured by a higher layer, a HARQ-ACK signal of a CB unit may be changed to a HARQ-ACK signal of a TB unit. In spite of this change, if additional bundling is needed, spatial bundling may be performed upon the HARQ-ACK signal of the TB unit.

2. Embodiment 2

If the number of HARQ-ACK bits exceeds a preset number or the number of HARQ-ACK bits (a codebook size) configured by a higher layer, the number of HARQ-ACK bits for a CBG per TB may be adjusted. For example, if N1<N2, bundling or multiplexing may be performed in order to reduce N2 to N1. Specifically, when it is necessary to additionally reduce the number of bits, spatial bundling between HARQ-ACK signals of a CBG is performed, using an AND operation or a consecutive ACK counter.

3. Embodiment 3

Spatial bundling may be performed upon each CBG index. For example, spatial bundling may be performed upon CBGs having the same index. In the case of a TB having a large number of CBGs, spatial bundling may be performed and HARQ-ACK signals may be transmitted to the remaining CBs, i.e., CBGs having indexes larger than a maximum index of a counterpart CBG.

However, regardless of the above-described embodiments, whether bundling is performed may be indicated through the DCI or higher layer signaling irrespective of a HARQ-ACK codebook size. For convenience of design, the number of CBGs of each TB may be equally adjusted. That is, the number of CBs constituting a CBG may differ according to a TB.

<Method of Multiplexing Retransmission of CBG Unit and Retransmission of TB Unit>

When the gNB schedules retransmission for a CB or a TB, scheduling for new data may also be performed. For example, in a legacy LTE system, during a MIMO operation, retransmission for one codeword has been scheduled and new data for other codewords has been scheduled.

Therefore, if retransmission of a CBG unit is supported and configured, it is still necessary to determine whether new data is to be transmitted in a TB unit. Accordingly, the present invention provides a method of multiplexing retransmission of a CBG unit and retransmission of a TB unit or new data.

1. Embodiment 1

Retransmission of a CBG unit is not performed together with new data. Considering that retransmission of the CBG unit is generated for compensation caused by URLLC corruption, retransmission of a plurality of CBGs may be demanded throughout a plurality of layers or codewords.

2. Embodiment 2

Retransmission of the CBG and transmission of new data are distinguished based on a codeword or a layer. That is, retransmission of a CBG may be scheduled for a specific codeword or layer and the new data may be scheduled for other codewords or layers.

In this case, an information size or a TBS of the new data may be limited according to a difference between a resource necessary for CBG retransmission and a resource necessary for new data transmission.

3. Embodiment 3

CBG retransmission and new data may be multiplexed in the same codeword or layer. If there is a plurality of codewords or layers to which the multiplexed new data and CBG retransmission are mapped, the same codewords or layers may have the same set and a part of the same codewords or layers may overlap. Alternatively, codewords or layers for another part, for example, CBG retransmission, may be a subset of codewords or layers for the new data, or vice versa.

Generally, the amount of resources necessary for CBG retransmission may be relatively small than the amount of resources necessary for the new data. Accordingly, multiplexing may be performed such that a part of the resources for the new data is used for the resources for CBS retransmission. Time and/or frequency resources to which CBG retransmission is mapped may be configured by a predetermined rule and the multiplexing method and scheme may be indicated through DCI and/or a higher layer.

<Retransmission Scheduling Method of CBG Unit>

Retransmission scheduling of a CBG unit may indicate, through DCI, a CBG corresponding actually to NACK, i.e., NACK for at least one or partial CBs in the CBG. Alternatively, CBG scheduling may be performed based on CBG-based HARQ-ACK feedback without introducing DCI for an additional CBG.

For example, the gNB may transmit DCI for TB-level scheduling to the UE. If the UE transmits a CBG-level HARQ-ACK signal, the gNB may retransmit a CBG corresponding to a NACK signal based on the CBG-level HARQ-ACK signal. In this case, the UE may decode a PDSCH while expecting that the UE will receive a CBG corresponding to the NACK signal based on the HARQ-ACK signal transmitted thereby.

However, ambiguity may occur due to occurrence of an error between HARQ-ACK feedback transmitted by the UE and HARQ-ACK feedback received by the gNB. Accordingly, in order to reduce such ambiguity, the gNB may transmit information as to whether the HARQ-ACK signal has been received to the UE again through the scheduling DCI. For example, the CBG-level HARQ-ACK signal may include a CRC and the gNB is aware of whether the HARQ-ACK signal transmitted by the UE has been successfully received through the CRC. The CRC may be included as the number of CBG-level HARQ-ACK bits increases.

Then, the gNB may transmit information as to whether the CRC has been successfully performed through the scheduling DCI again. If the CRC has been successfully performed, it may be assumed that there is no ambiguity in a CBG which is to be retransmitted between the UE and the gNB. If the CRC fails, the gNB may indicate information indicating that the CRC has failed through the DCI and the UE may decode the PDSCH under the assumption that TB-level retransmission is performed.

<Method of Performing CB-level Retransmission without Transmitting CB-level or CBG-level HARQ-ACK Signal>

In some cases, a transmitter may be surely aware that an error will occur in a specific CB in a receiver due to puncturing of URLLC. Then, CB-level or CBG-level retransmission may be performed regardless of whether HARQ-ACK has been transmitted. In this case, the UE needs to distinguish between TB-level scheduling and CB-level retransmission.

Accordingly, whether TB-level scheduling is performed or CB-level retransmission is performed may be indicated through a specific field of the DCI or by distinguishing between SSs, differently using scrambling or an RNTI, or distinguishing between a grant before the UE transmits a HARQ-ACK signal and a grant in the other cases.

It is also necessary to distinguish between CB-level retransmission caused by puncturing without HARQ-ACK transmission and CB-level retransmission caused by HARQ-ACK transmission of the UE and the above-mentioned schemes may be similarly used. The operation of the UE may be different according to the above-described schemes.

Upon receiving CB-level or CBG-level retransmission caused by puncturing, the UE may flush corresponding CBs in a buffer and newly receive data. In the case of normal CB-level or CBG-level retransmission, HARQ-ACK combining, for example, chase combining, may be performed.

In CB-level or CBG-level retransmission, CBs which should be flushed in the buffer and CBs which do not need to be flushed in the buffer may be transmitted together. Accordingly, the CBs which should be flushed and the CBs which do not need to be flushed may be separately indicated or one bit may be used to indicate that all CBs should be flushed or chase combining should be performed.

In the case of separate indication, such indication may be transmitted over separate channels using multi-level DCI. For example, information about a HARQ-ACK combining CB may be transmitted through second DCI and the second DCI may indicate third DCI so that information about CB s that should be flushed may be transmitted through the third DCI. Alternatively, the indication may be transmitted over one channel through separate encoding.

<CBG Configuration Method and Mapping Method>

Each CB may be mapped to a physical resource after modulation, scrambling, and/or rate matching is performed. The physical resource may include the spatial domain such as a layer or a codeword, the frequency domain such as a subcarrier, and the time domain such as an OFDM symbol.

In a next-generation system, a plurality of traffic transmissions having different service requirements or latency requirements may be scheduled on the same time-frequency resource. For example, URLLC may be transmitted such that a part of resources of URLLC overlaps in the middle of eMBB transmission. In this case, a partial resource of eMBB which is being transmitted may be punctured and then URLLC may be transmitted. Specifically, time-frequency resources for all layers may be punctured or time-frequency resources for a specific layer or a layer set may be punctured.

When the time-frequency resources for the specific layer or the layer set are punctured, a detailed embodiment of a method of indicating a resource impacted by puncturing will now be described.

1. Embodiment 1-1

In indicating the impacted resource, information about a layer or a layer set is included. Specifically, indication information regarding the impacted resource may include an index of a corresponding layer or layer set and include information about a time and/or frequency resource.

This method may be regarded as supporting multi-user MIMO (MU-MIMO) between a plurality of transmissions, such as eMBB and URLLC, for different service requirements, latency requirements, or scheduling durations. Specifically, an RS (e.g., demodulation RS (DMRS)) for transmission preempting a transmission resource for different services may preempt or puncture a specific time and/or frequency resource throughout all layers.

2. Embodiment 1-2

In indicating the impacted resource, information about a time and/or frequency resource of each layer or each layer set or information as to whether the impacted resource is present may be included.

The UE may flush corrupted coded bits only for a corresponding layer during demodulation or decoding by additionally recognizing information about a layer.

Coded symbols in which a plurality of CBs is concatenated based on an LTE system have been mapped in order of a layer, a frequency index, and a symbol index within the same codeword.

That is, the coded symbols start to perform mapping to a layer, a subcarrier, and a symbol of a low index within a specific codeword and perform mapping while increasing a layer index within the specific codeword. After mapping the last layer index, the subcarrier index is increased. Next, mapping starting from a layer of a low index is repeated. After a subcarrier index reaches a maximum value, mapping is performed while increasing a symbol index.

The above-described mapping method is referred to as mapping performed in order of the layer, the frequency domain, and the time domain. The coded symbols mapped to a plurality of layers on the same time-frequency resource have a high possibility of belonging to the same CB or CBG. Therefore, if a service having difference service requirements and/or latency requirement such as URLLC attempts to perform preemption, preemption caused by URLLC may have a possibility of being concentrated in a specific CB or CBG.

Accordingly, in order to improve/guarantee decoding performance after a specific TB is preempted, it may be useful to distribute corrupted coded bits in multiple CBs or CBGs rather than to concentrate the corrupted coded bits in a specific CB or CBG.

Conversely, in consideration of CB-based or CBG-based retransmission, concentrated generation of the corrupted coded bits in a specific CB or CBG may cause gain. Specifically, a CB or CBG mapped to each layer on the same time-frequency resource may be different. In this case, the CB or CBG mapped to each layer may differ according to a code rate, an MCS, a TBS, and/or resource allocation such as wideband or narrowband, for transmission which may include the impacted resource.

Hereinafter, a detailed embodiment of a method of mapping a CB or a CBG to a plurality of layers, subcarriers, or symbols will be described.

1. Embodiment 2-1

Mapping may be performed in order of the frequency domain, the time domain, and the layer or in order of the time domain, the frequency domain, and the layer. In this case, there is a high possibility that a specific CB or CBG is mapped to only a specific layer. Therefore, since spatial diversity may not be obtained with respect to the specific CB or CBG, performance degradation may occur. However, when preemption caused by URLLC is considered, specific impacted resources may be distributed in a plurality of CBs or CBGs so that a possibility of successfully performing decoding prior to retransmission may become higher.

2. Embodiment 2-2

Mapping may be performed in order of the layer, the frequency domain, and the time domain or in order of the layer, the time domain, and the frequency domain. In addition, interleaving may be differently applied to coded symbols per layer or layer set.

For example, a starting time and/or frequency resource for mapping may be differ according to a layer. Specifically, when mapping is performed in order of the layer, the frequency domain, and the time domain and mapping in the frequency domain is applied within one symbol, if one CB is mapped to a plurality of layers, a plurality of layers may be mapped to different frequency regions so that the CB may be transmitted in multiple frequency regions.

This scheme may be more useful when a frequency region to which one CB is mapped is not wideband. Accordingly, this mapping scheme may be triggered according to the number of CB s mapped to all scheduling units or may be triggered only when a configured resource region is wideband. Alternatively, interleaving may be performed on symbols coded prior to mapping.

Interleaving may limit an interleaved maximum duration in consideration of latency during decoding of CBs. For example, interleaving may be performed upon the same symbol or upon coded symbols in a mini slot.

Specifically, since interleaving in a specific time duration may be changed according to scheduling and thus may not be suitable for UE implementation, interleaving may be linked to system bandwidth or subband size instead of scheduling.

For example, a PRB bundling size may be determined based on system bandwidth and interleaving may be generated in a PRB bundling size unit. If interleaving is performed in a coded bit unit instead of a modulation symbol, interleaving may be performed based on a specific modulation order.

A detailed embodiment of interleaving will now be described. Interleaving may be performed upon sequentially concatenated CBs or CBGs in a specific duration or all durations. Interleaving may include sequentially inputting the CBs or CBGs to a specific matrix row-by-row or column-by-column, performing permutation in units of columns or rows, and extracting the CBs or CBGs column-by-column or row-by-row.

A basic unit of interleaving, i.e., each element unit of a specific matrix, may be a coded bit, a coded modulation symbol, a CB, or a CBG.

In consideration of a MIMO operation for a coded bit or symbol, a specific CB or CBG may be a symbol group considering the number of layers or layer sets in a specific codeword so that the specific CB or CBG may be evenly distributed in a plurality of layers and then may be mapped. For example, when the number of layers in a specific codeword is L, the basic unit of interleaving may be L coded symbols. If interleaving is performed in a bit unit, interleaving may be performed in a group unit of (L*number of bits per modulation symbol) bits. The above-described interleaving scheme is purely one example and other schemes may be extended to the present invention for the basic unit of interleaving.

3. Embodiment 2-3

Mapping may be performed in order of the frequency domain within PRB bundling, one of a frequency region of a fixed size and a set of frequency PRBs which are defined by a higher layer or in the specification, a layer, a PRB bundle index, and the time domain.

The above-described embodiment is similar to change from mapping in order of the layer, the frequency domain, and the time domain in units of a single RE in a legacy LTE system to mapping in order of the layer, the frequency domain, and the time domain in units of a plurality of REs and/or PRBs.

A PRB bundle size or a frequency region size may include a single PRB and may be configured by a plurality of PRBs or a plurality of subcarriers. Particularly, the PRB bundle size may be linked with a CB size and/or the number of CBs.

During mapping in units of a plurality of PRBs, interleaving may be performed between PRB groups or PRB bundles. In addition, Embodiment 2-2 may be modified to be applied in order of the layer, the frequency domain in a PRB bundle in which each layer is mapped to different PRB bundles or PRB group frequency locations, and the time domain.

That is, each layer is mapped first and then mapped to different frequency regions so that the regions may be determined based on a bundle size. If interleaving is differently applied to each layer so as to obtain frequency diversity, an interleaving unit may be a PRB group or a PRB bundle.

The layer is an example indicating a resource of the spatial domain, the subcarrier is an example indicating a resource of the frequency domain, and the symbol is an example indicating a resource of the time domain. The layer, the subcarrier, and the symbol may be represented in other manners. A description of the mapping scheme is purely exemplary and the above schemes may be supported through previous interleaving even if mapping of other schemes such as an order of the layer, the frequency domain, and the time domain is used.

The mapping scheme of the above-described embodiment may be basically configured or may be indicated by the gNB to the UE through higher layer signaling. Alternatively, in order to change the mapping scheme according to a useful scenario, the mapping scheme may be indicated through DCI. The mapping scheme may be selected based on an MCS, a schedule PRB size, and/or a code rate, for a PDSCH or a PUSCH. In addition, a threshold value, which is a reference for selection, may be indicated by a higher layer.

For example, if a code rate is less than a specific threshold value and, therefore, it is determined that decoding using other coded bits may be performed even if there is preemption caused by URLLC, the gNB may configure coded symbols mapped to a plurality of layers to belong to different CBs or CBGs, using the same time and frequency resource. In the other cases, mapping may be selected such that impacted resources may be concentrated in a specific CB or CBG.

Assuming that HARQ-ACK transmission and retransmission are performed in a CBG unit, a parity CB may be generated in a CBG unit and the parity CB may be transmitted as follows.

1. Embodiment 3-1

A parity bit is generated with respect to each CBG and each CBG is transmitted by adding a parity CB to an existing CB. Interleaving may be performed only in a duration in which each CBG is mapped. For example, interleaving may be performed in a symbol. A resource for transmitting the parity CB may be preconfigured by a network or may be configured by the UE through rate matching.

2. Embodiment 3-2

A parity CB may be generated with respect to each CBG. After all CBs are mapped, i.e., after mapping of all resources is ended, parity CBs may be uniformly mapped to each CBG or each CB by performing rate matching.

In a next-generation system, the number of CBs for a specific TB may significantly increase as compared with an LTE system and the number of CBs in the same symbol may be plural.

For different traffic transmissions having different service requirements and/or different latency requirements, if specific traffic such as URLLC preempts traffic which is performing another transmission such as eMBB, a plurality of CB s may be impacted. For example, when URLLC has a scheduling unit corresponding to a plurality of symbols based on eMBB, CBs caused by URLLC preemption may have a specific pattern. Specifically, when N CBs are present in each symbol with respect to eMBB and URLLC is transmitted in two symbols, if an n-th CB and different traffic overlap in the first symbol, then an (n+N)-th CB, which is after N CB s, and different traffic may overlap in the second symbol.

Therefore, in selecting CBs constituting a CBG, discontinuous CBs may be selected to belong to one CBG in consideration of URLLC preemption. Specifically, discontinuous CBs belonging to the same CBG may be continuous in terms of a time and/or frequency resource. Herein, discontinuous CBs may mean that indexes of CBs are not continuous.

The above-described embodiment may be useful in terms of reduction of overhead when retransmission of a CBG unit is indicated. For example, CBs belonging to a CBG may be configured based on a configured time and/or frequency resource according to granularity of information indicating an impacted resource.

The gNB may indicate a time and/or frequency resource unit for configuring a CBG to the UE through additional configuration. For example, if a specific CB overlaps with a plurality of resource sets, (1) the CBs may be included in a specific CBG according to an overlapped degree or an overlapped portion, i.e., the number of overlapped resource elements or the number of overlapped symbols, (2) the CBs are included in only a CBG having relatively greatly overlapped systematic bits of a CB, or (3) the CBs are repeatedly included in all overlapped CBGs.

Figure 11:
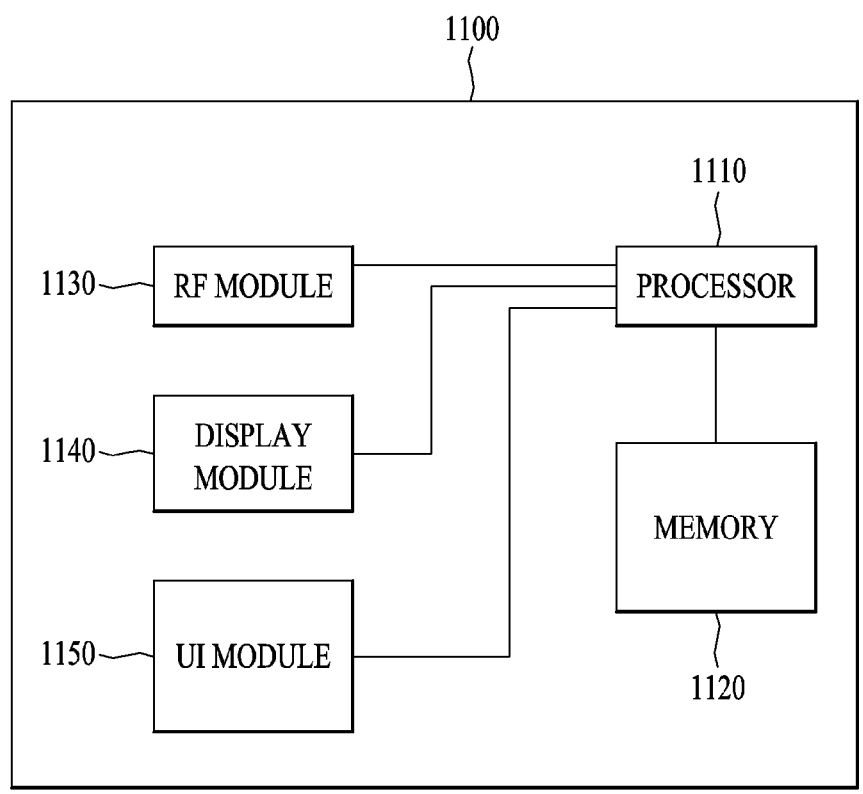
FIG. 11 is a block diagram of a communication apparatus according to an embodiment of the present disclosure

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present disclosure described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method of transmitting a HARQ-ACK signal in the wireless communication system and the apparatus therefor have been described focusing on an example applied to the 5G NewRAT system, the method and apparatus are applicable to various wireless communication systems in addition to the 5G NewRAT system.

The invention claimed is:

1. A method for receiving retransmitted data by a user equipment (UE) in a wireless communication system, the method comprising:
    receiving a plurality of transport blocks including a plurality of code block groups from a base station (BS);
    mapping a plurality of code block groups to first hybrid automatic request (HARQ)-acknowledgement (ACK) signals, based on an order of reception of each of the plural transport blocks and an order of the code block groups included in each of the plural transport blocks, and transmitting the first HARQ-ACK signals; and
    receiving one or more code block groups retransmitted based on the transmitted first HARQ-ACK signals,
    wherein even-numbered or odd-numbered code block groups in each of the plural transport blocks are mapped to the first HARQ-ACK signals first and then the remaining code block groups are additionally mapped to the first HARQ-ACK signals.

2. The method of claim 1, wherein code block groups starting from a code block group having a lowest index in each of the transport blocks, among the code block groups included in each of the plural transport blocks, are mapped to the first HARQ-ACK signals in ascending order.

3. The method of claim 1, wherein only at least one code block group corresponding to a negative-acknowledgement (NACK) signal among the plural code block groups is mapped to the first HARQ-ACK signals.

4. The method of claim 1, wherein a second HARQ-ACK signal for each of the plural transport blocks is transmitted together with the first HARQ-ACK signal, and the first HARQ-ACK signal and the second HARQ-ACK signal are transmitted over different channels.

5. The method of claim 4, wherein, based on the number of the code blocks included in the plural transport blocks being smaller than a threshold, only the second HARQ-ACK signal is transmitted.

6. The method of claim 1, wherein the first HARQ-ACK signals are transmitted by being piggybacked on an uplink data channel.

7. The method of claim 1, wherein the first HARQ-ACK signal includes a cyclic redundancy check (CRC) bit for checking whether the first HARQ-ACK signal is received, and wherein downlink control information (DCI) including information, informing the UE as to whether the first HARQ-ACK signal is received by the BS, based on the CRC bit, is received from the BS.

8. A user equipment (UE) for receiving retransmitted data in a wireless communication system, the UE comprising:
    a radio transmitter and a receiver configured to transmit and receive a radio signal to and from a base station (BS); and
    a processor connected to the transmitter and receiver, and configured to:
    receive a plurality of transport blocks including a plurality of code block groups from the BS,
    map a plurality of code block groups to first hybrid automatic request (HARQ)-acknowledgement (ACK) signals, based on an order of reception of each of the plural transport blocks and an order of the code block groups included in each of the plural transport blocks, and transmit the first HARQ-ACK signals, and receive one or more code block groups retransmitted based on the transmitted first HARQ-ACK signals, wherein even-numbered or odd-numbered code block groups are mapped to the first HARQ-ACK signals first and then the remaining code block groups are additionally mapped to the first HARQ-ACK signals, with respect to each of the plural transport blocks.

9. The UE of claim 8, wherein only at least one code block group corresponding to a negative-acknowledgement (NACK) signal among the plural code block groups is mapped to the first HARQ-ACK signal.

10. The UE of claim 8, wherein a second HARQ-ACK signal for each of the plural transport blocks is transmitted together with the first HARQ-ACK signal, and the first HARQ-ACK signal and the second HARQ-ACK signal are transmitted over different channels.

11. The UE of claim 10, wherein, based on the number of the code blocks included in the plural transport blocks being smaller than a threshold, only the second HARQ-ACK signal is transmitted.

12. The UE of claim 8, wherein the first HARQ-ACK signals are transmitted by being piggybacked on an uplink data channel.

13. The UE of claim 8, wherein the first HARQ-ACK signal includes a cyclic redundancy check (CRC) bit for checking whether the first HARQ-ACK signal is received, and wherein downlink control information (DCI) including information, informing the UE as to whether the first HARQ-ACK signal is received by the BS, based on the CRC bit, is received from the BS.

* * * * *